United States Patent [19]

Sugasawa et al.

[11] 4,256,074
[45] Mar. 17, 1981

[54] CONTROL SYSTEM FOR CLOSED LOOP MIXTURE CORRECTION AND SPLIT ENGINE OPERATION

[75] Inventors: Fukashi Sugasawa; Yukihiro Etoh, both of Yokohama, Japan

[73] Assignee: Nissan Motor Company, Limited, Yokohama, Japan

[21] Appl. No.: 46,309

[22] Filed: Jun. 7, 1979

[30] Foreign Application Priority Data

Jun. 16, 1978 [JP] Japan .................................. 53-72849

[51] Int. Cl.³ .............................................. F01N 3/15
[52] U.S. Cl. .............................. 123/440; 123/198 F;
60/276; 60/285; 60/301
[58] Field of Search ....... 123/32 EA, 119 EC, 198 F, 123/119 LR, 59 EC; 60/276, 285, 301

[56] References Cited

U.S. PATENT DOCUMENTS

| 2,875,742 | 3/1959  | Dolza      | 123/119    |
|-----------|---------|------------|------------|
| 3,765,205 | 9/1973  | Frost      | 123/32 EA  |
| 3,765,394 | 10/1973 | Francis    | 123/198 F  |
| 3,767,764 | 10/1973 | Dolrear    | 60/301     |
| 3,984,975 | 10/1976 | Price      | 60/301     |
| 4,107,921 | 8/1978  | Iizuka     | 123/198 F  |
| 4,114,374 | 9/1978  | Tanahashi  | 123/198 F  |
| 4,134,261 | 1/1979  | Iizuka et al. | 60/299  |
| 4,146,006 | 3/1979  | Garabedian | 123/32 EA  |
| 4,165,610 | 8/1979  | Iizuka et al. | 60/285  |
| 4,186,715 | 2/1980  | Iizuka et al. | 123/198 F |
| 4,210,109 | 7/1980  | Nakajima et al. | 123/59 EC |

Primary Examiner—Charles J. Myhre
Assistant Examiner—R. A. Nelli
Attorney, Agent, or Firm—Schwartz, Jeffery, Schwaab, Mack, Blumenthal & Koch

[57] ABSTRACT

A control system for a multi-cylinder internal combustion engine comprises a split engine control unit for operating the engine on partial cylinders when reduced engine power can adequately operate the vehicle, and first and second exhaust conduits for directing exhaust gases from first and second group cylinders respectively to a common junction to which a common exhaust conduit is connected for directing the gases to the atmosphere. A first set of an exhaust gas sensor and catalytic converter is disposed in the first conduit to be exposed to the stream of gases exhausted from the second group cylinders which are activated at all times and a second set of an exhaust gas sensor and catalytic converter is disposed in the common conduit to be exposed to the stream of gases exhausted from the first group cylinders directed through the first conduit and to the gases passed through the upstream side catalytic converter in the second conduit. A feedback control circuit is responsive selectively to a signal from the first gas sensor during the partial cylinder operation for correcting the ratio of mixture supplied to the second group cylinders and to a signal from the second gas sensor during the full cylinder operation for correcting the ratio of mixture supplied to all the cylinders.

4 Claims, 5 Drawing Figures

4,256,074

CONTROL SYSTEM FOR CLOSED LOOP MIXTURE CORRECTION AND SPLIT ENGINE OPERATION

BACKGROUND OF THE INVENTION

The present invention relates to control systems for multiple cylinder internal combustion engines, and in particular to a control system which combines closed-loop mixture control and split engine operations.

It is known that fuel economy is achieved under light load conditions by operating a multiple cylinder engine on partial cylinders if the reduced engine power can adequately operate the vehicle. When the engine load is relatively heavy the engine is operated on full cylinders. The whole cylinders are thus divided into a first group which is at all times operated and a second group which is operated under heavy load. This method of engine control is known as split engine operation. On the other hand, closed-loop mixture control systems are also known and widely used as an effective means of eliminating noxious gaseous components. Such system employ an exhaust gas sensor and a three-way catalytic converter disposed downstream of the gas sensor to effect simultaneous oxidation of hydrocarbon and monoxide and reduction of nitrogen oxides when the air-fuel ratio is precisely controlled to within a predetermined range, known as converter which corresponds to the stoichiometric air-fuel ratio.

However, the above known methods cannot be combined together without giving rise to a problem in that the deactivated cylinders under light load operate as a pump to introduce air into the exhaust system thereby increasing oxygen contents, which results in a false gas sensor signal. To prevent this problem, a prior method involves the use of a shutoff valve to direct the stream of pumped air through a passage that bypasses the catalytic converter during partial cylinder mode, and switch the direction of the gas flow to the catalytic converter during the full cylinder mode.

However, because of the inherent delay time the exhaust gas takes to reach the location of the shutoff valve, the signal that controls the shutoff valve must be precisely timed in relation to the delay time and if improperly timed a false gas sensor signal would result.

SUMMARY OF THE INVENTION

Accordingly, an object of the present invention is to provide a control system for a multi-cylinder internal combustion engine which effects reduction of noxious gas components during transient periods when the engine operation is a witched between full and partial cylinder modes.

The present invention contemplates the use of first and second exhaust passages for directing gases exhausted from first and second cylinders of the engine respectively to a common joint to which a common exhaust passage is connected for directing exhaust gases to the atmosphere, and the use of a first exhaust gas sensor and a first catalytic converter disposed in the second exhaust passage and a second exhaust gas sensor and a second catalytic converter disposed in the common exhaust passage. A split engine control circuit is provided to effect full cylinder engine operation in which both first and second cylinders are activated when the engine load is above a predetermined value and effect partial cylinder operation in which only the second cylinder is activated when the load is below the predetermined value. A feedback control circuit is selectively responsive to a signal from the first exhaust gas sensor during the partial cylinder operation and responsive to a signal from the second exhaust gas sensor during the full cylinder operation.

BRIEF DESCRIPTION OF THE DRAWINGS

The invention will be further described by way of example with reference to the accompanying drawings, in which.

DETAILED DESCRIPTION

Figure 1:
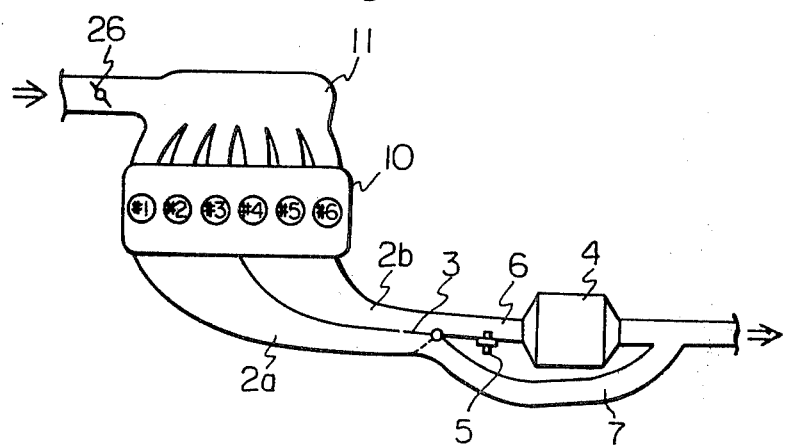
FIG. 1 is a schematic diagrammatic view showing the prior art arrangement.

Before describing the present invention reference is first made to FIG. 1 in which the prior art closed-loop mixture controlled split engine operating system is schematically illustrated. In FIG. 1, the first group cylinders No. 1 to No. 3 of an engine 10, which are deactivated under light load conditions, communicate through an exhaust conduit 2a and a conduit 7 to the atmosphere, while the second group cylinders No. 4 to No. 6, which are activated at all times, communicate through conduit 2b and a common passage 6 to a three-way catalytic converter 4 and thence to the atmosphere.

In the common conduit 6 is provided an exhaust gas sensor 5 to generate a gas sensor output signal for feedback control purposes. A changeover valve 3 is provided between the conduits 2a and 2b to assume a position indicated by broken lines to direct the exhaust gases from the first group cylinders to the common conduit 6 during full cylinder mode of operation and operated to assume a second position indicated by a solid line to allow the air pumped from the deactivated cylinders to pass through the conduit 7 which bypasses the gas sensor 5 and catalytic converter 4 when the engine is operated on partial cylinders.

If the switching valve 3 is activated at a point in time which is earlier than the time at which the engine operation is switched from partial to full cylinder modes, a certain amount of residual air from the previously deactivated cylinders tends to mix with the exhaust gases from the activating cylinders in the common conduit 6, whereby the gas sensor 5 will generate a signal which is an indication that an excessive amount of air is present in the exhaust gases. This results in an excessively enriched mixture and a decrease in efficiency for reducing the NOx components. Conversely, if the valve switching is delayed from the time the operational mode is switched from partial to full cylinders, the burnt gases exhausted from the first group cylinders are allowed to bypass the catalytic converter 4. Similar undesirable consequences tend to occur when the mode is switched from full to partial cylinders.

Figure 2:
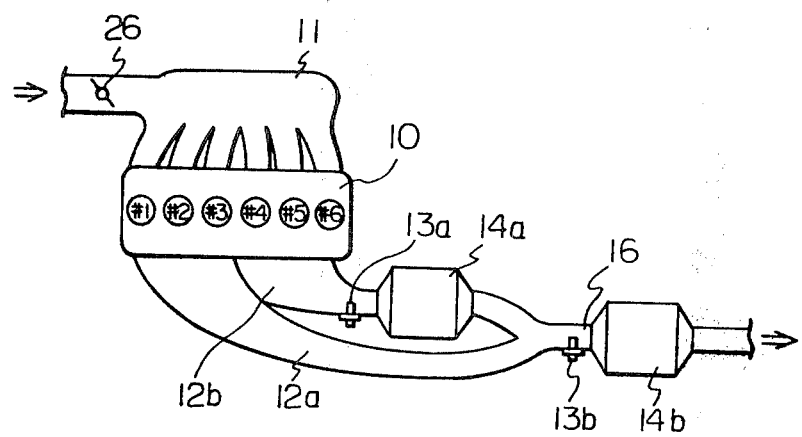
FIG. 2 is a schematic diagrammatic view showing an arrangement according to the invention.

In FIG. 2 the engine control system of the invention is shown as comprising a first exhaust conduit 12a connected to the first group cylinders No. 1 to No. 3 for leading the exhaust gases therefrom to a common exhaust conduit 16 and a second exhaust conduit 12b connected to the second group cylinders No. 4 to No. 6 for leading the exhaust gases therefrom to the common passage 16 through a first three-way catalytic converter 14a. A first exhaust gas sensor or oxygen sensor 13a is mounted in the conduit 12b upstream of catalytic converter 14a and a second exhaust gas sensor 13b is mounted in the common passage 16 also upstream of the catalytic converter 14b.

During partial cylinder mode the output signal from the gas sensor 13a is utilized for feedback control operation and during full cylinder mode the output signal from the gas sensor 13b is utilized for feedback operation.

Figure 3:
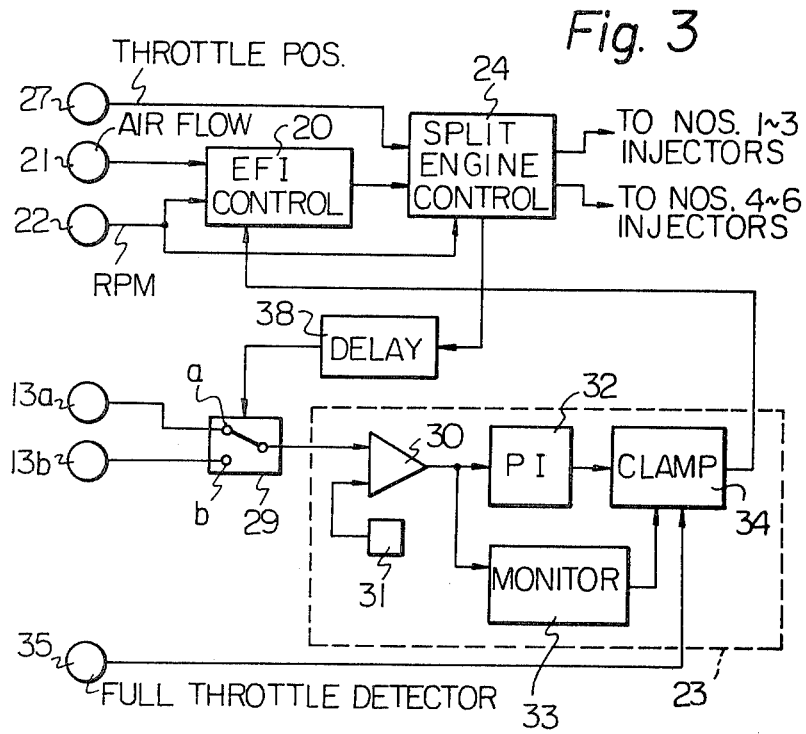
FIG. 3 is a circuit diagram associated with the arrangement of FIG. 2.
Figure 4A:
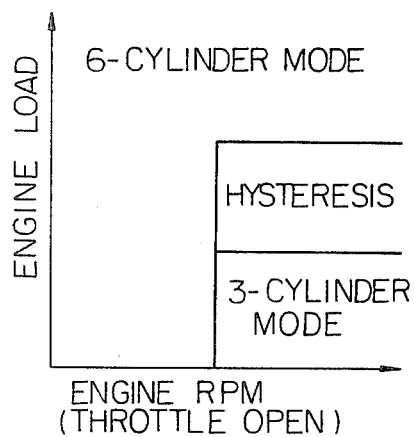
FIGS. 4a and 4b are explanatory graphic diagrams of the split engine control circuit of FIG. 3.
Figure 4B:
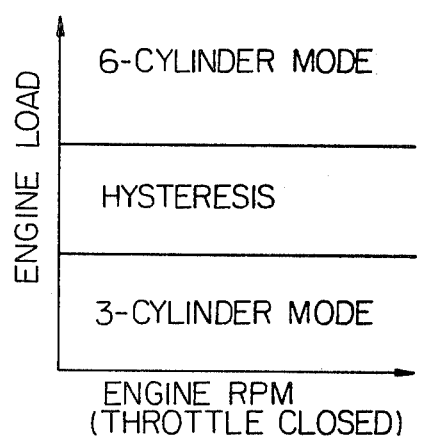

FIG. 3 is an illustration of the control circuit of the invention. An electronic fuel injection control unit 20 takes its inputs from an intake air flow sensor 21 and from an engine speed sensor 22 and computes on these input data to obtain an air quantity taken in per engine crankshaft revolution and derives an injection pulse with a length proportional to the computed air quantity that represents the engine output power or load. The injection pulse is supplied in synchronism with crankshaft revolution to a split engine control circuit 24 and thence to the first group cylinders No. 1 to No. 3 and also to the second group cylinders No. 4 to No. 6. The split engine control circuit 24 is also responsive to signals from the engine speed sensor 22 and from a throttle position sensor 27 which is connected to the throttle control valve 26 disposed in the intake air passage 11. The throttle position sensor 27 provides a signal indicating that the throttle control valve 26 is open. In the presence of a throttle-open signal from the throttle position sensor 27, the split engine control circuit 24 detects when the engine speed falls below a preselected value. The split engine control circuit 24 includes means responsive to the pulse length of the injection pulse to detect the magnitude of engine load to generate a full cylinder mode command signal when the detected engine load is above a preselected value depending on the engine speed value and the throttle position as illustrated in FIGS. 4a and 4b. In FIG. 4a, if the engine speed is below the preselected value, the split control circuit 24 generates a full cylinder command signal to permit the engine to operate on full cylinders regardless of the engine load provided that the throttle is open. If the engine speed is above the preselected value the detected engine load is taken into account to permit partial cylinder operation. If the throttle is closed, FIG. 4b, the engine speed is not always taken into account and the split control circuit delivers a full cylinder command signal in response to the detected engine load exceeding a preselected value. This permits partial cylinder operation when the engine is idled.

During the full cylinder mode, injection control pulses are supplied to all the fuel injectors No. 1 to No. 6, and during the partial cylinder mode the injection pulses to the No. 1 to No. 3 are disabled.

To prevent the split engine control system to repeatedly switch between partial and full cylinder modes as the detected engine load crosses the preselected value due to insignificant variations of engine load, the circuit 24 is also provided with means for providing a hysteresis action which permits the system to maintain the previous operational mode as the mode has been changed even though the engine load varies immediately after the mode switching event (FIGS. 4a, 4b).

The full cylinder command signal provided by the split engine control circuit 24 is supplied through a delay circuit 38 to a changeover switch 29. This switch has a first stationary contact "a" connected to the gas sensor 13a and a second stationary contact "b" connected to the gas sensor 13b and a moving contact arm connected to the contact "a" in the absence of a full-cylinder command signal from the delay circuit 38. In the presence of the signal from the delay circuit 38, the switch 29 is operated to move its contact arm to the position "b".

A feedback control circuit 23 is provided which includes a comparator 30 having a first input terminal connected to the moving contact arm of the switch 29 for making a comparison with a reference voltage supplied from a source 31 representing the stoichiometric air-fuel ratio. The comparator 30 provides an output signal at one of two discrete levels depending on whether the signal from the gas sensors is above or below the reference voltage and supplies its output to a proportional/integral controller 32 and thence to a clamping circuit 34. The feedback control circuit 23 further includes a monitor circuit 33 which serves to detect when the gas sensor output level remains low during low temperature periods such as cold engine start and signals the clamping circuit 34 to cause it to clamp the control signal from the PI controller 32 at a constant or disabled level so as to suspend closed loop mixture control operation. The clamping circuit 34 also receives a signal from a full throttle detector 35 which occurs when the throttle valve 26 is fully open for maximum acceleration to clamp the control signal for suspending the closed loop operation to permit the engine to give a maximum output power.

Under normal feedback loop operation, the signal from the controller 32 is fed through the clamp circuit 34 to the electronic fuel injection control unit 20 to correct the width of the injection pulse to maintain the air-fuel ratio of mixture supplied to the engine 10 at the stoichiometric point represented by the reference voltage supplied from the source 31. When the engine is operated at a reduced load the split engine control circuit 24 detects its by sensing the pulse length of the injection pulse becoming smaller than the preset value and provides no signal to the delay circuit 38, so that the comparator 30 is fed with a signal from the gas sensor 13a and the mixture supplied to the second group cylinders No. 4 to No. 6 is controlled only in response to the signal from the gas sensor 13a and the exhaust gases from the second group cylinders are purified by the catalytic converter 14a. At heavy engine load the control circuit 24 provides a full cylinder command signal which is delayed by 38 for a time period sufficient to allow the residual air in the conduit 12a to be completely exhausted through conduit 16 and allow the exhaust gases from the now activated first group cylinders No. 1 to No. 3 to reach the gas sensor 13b. If without this delay interval, the residual air would affect the gas sensor 13b output resulting in a false signal. When the operational mode is switched from full to partial cylinders, the delay circuit 38 also provides a delay interval at the termination of the full cylinder command signal. This delay interval has the effect of allowing the possible slight difference in gas concentration between the first and second group cylinders to reduce to a minimum. If such concentration difference does not exist, the delay interval at the termination of the full cylinder command signal would be unnecessary since the gases exhausted from the previously activated cylinders No. 1 to No. 3 would produce no adverse effect on the active gas sensor 13a even if the changeover switch 29 is released to the "a" position simultaneously in response to the termination of the full cylinder command signal.

During the partial cylinder mode the noxious components are purified by means of the converter 14a, so that the downstream side converter 14b has no substantial purifying effect. During this mode the temperature of the converter 14b may be reduced by the air pumped through the conduit 12a. However, this temperature reduction will not materially affect the performance of the converter 14b because the partial cylinder operation will not practically exist for such long intervals as to reduce the temperature to a level as encountered during the period of cold starts.

Although the present invention involves the use of two cascaded catalytic converters, the combined purifying capacity of the converters is approximately the capacity of a single converter employed solely to purify the gases exhausted from all the cylinders, since each converter is exposed to the gases exhausted from substantially one half of the full cylinders at all times.

What is claimed is:

1. A control system for an internal combustion engine having first and second cylinder groupings, comprising:
    split engine control means for operating said engine on full cylinders in which said first and second cylinder groupings are activated to give higher engine power when the magnitude of engine load is above a predetermined value or operating said engine on less than full cylinders in which only said second cylinder grouping is activated to give a lower engine power when the engine load magnitude is below said predetermined value;
    first and second exhaust conduits for passing exhaust gases from said first and second cylinder groupings, respectively, to a common junction;
    a common exhaust conduit connected to said common junction for passing exhaust gases therethrough to the atmosphere;
    a first exhaust gas sensor and a first catalytic converter disposed in said second exhaust conduit;
    a second exhaust gas sensor and a second catalytic converter disposed in said common conduit; and
    feedback control means selectively responsive to a signal from said first exhaust gas sensor when said engine is operated on partial cylinder for correcting the air-fuel ratio of mixture supplied to said second cylinder grouping to a desired value or responsive to a signal from said second exhaust gas sensor when said engine is operated on full cylinders for correcting the air-fuel ratio of mixture supplied to both said first and second cylinder groupings to said desired value.

2. A control system as claimed in claim 1, further comprising delay interval introducing means responsive to the initiation of the full cylinder engine operation for introducing a delay interval sufficient to allow gases in said first exhaust conduit to be exhausted through said common conduit to the atmosphere to permit said feedback control means to respond to the signal from said second exhaust gas sensor at the termination of said delay interval.

3. A control system as claimed in claim 1 or 2, further comprising delay interval introducing means responsive to the initiation of the partial cylinder engine operation for introducing a delay interval to permit said feedback control means to respond to the signal from said first exhaust gas sensor at the termination of the last-mentioned delay interval.

4. A control system as claimed in claim 1, wherein said feedback control means comprises a comparator having a first input terminal selectively responsive to signals from said first or second exhaust gas sensors and a second input terminal connected to a reference voltage representing the stoichiometric air-fuel ratio for generating a signal at one of two discrete levels depending on whether the signal presented at said first input terminal is above or below said reference level for correcting the air-fuel ratio of mixture supplied to said cylinders.

* * * * *